United States Patent [19]

Chang

[11] Patent Number: 4,546,167
[45] Date of Patent: Oct. 8, 1985

[54] P-TMXDI POLYURETHANE ELASTOMERS WITH GOOD COMPRESSION SET PROPERTIES

[75] Inventor: Eugene Y. C. Chang, Bridgewater, N.J.

[73] Assignee: American Cyanamid Company, Stamford, Conn.

[21] Appl. No.: 634,081

[22] Filed: Jul. 30, 1984

[51] Int. Cl.$^4$ .................... C08G 18/12; C08G 18/16; C08G 18/26; C08G 18/18
[52] U.S. Cl. ........................ 528/64; 528/44; 528/48; 528/49; 528/53; 528/56; 528/58
[58] Field of Search .................... 528/64, 44

[56] References Cited

U.S. PATENT DOCUMENTS

| | | | |
|---|---|---|---|
| 3,194,793 | 1/1965 | Kogon | 521/163 |
| 3,290,350 | 12/1966 | Hoover | 260/453 A |
| 3,428,610 | 2/1969 | Klebert et al. | |
| 3,507,834 | 4/1970 | Wittbecker | 528/44 |
| 3,549,596 | 12/1970 | McMillin et al. | 260/75 |
| 3,997,514 | 12/1976 | Kogon . | |
| 4,071,558 | 1/1978 | Bentley | 528/64 |
| 4,218,543 | 8/1980 | Weber et al. . | |
| 4,341,875 | 7/1982 | Visger et al. | 521/164 |
| 4,459,399 | 7/1984 | Ihrman | 528/64 |
| 4,463,126 | 7/1984 | Gruber et al. | 528/64 |

*Primary Examiner*—Herbert S. Cockeram
*Attorney, Agent, or Firm*—Henry C. Jeanette

[57] ABSTRACT

Polyurethane elastomer compositions, having a compression set less than or equal to about 40% are disclosed. These polyurethane elastomer compositions comprise the reaction product of:

(a) A polyurethane prepolymer having terminally reactive isocyanate groups and formed as a reaction product of polymeric diol with a stoichiometric excess of p-tetramethylxylene diisocyanate (p-TMXDI); with (b) A curatively effective amount of a curative selected from the group consisting of: diethyltoluenediamine (DETDA), 2,4-bis (p-aminobenzyl)aniline (BABA), and mixtures thereof; and (c) Optionally, from about 0.01% to about 2% by weight of catalyst, based on the weight of curative.

These polyurethane elastomers are used in molded articles which are to be used under load as in machine rolls and wheels.

26 Claims, No Drawings

P-TMXDI POLYURETHANE ELASTOMERS WITH GOOD COMPRESSION SET PROPERTIES

FIELD

This invention relates to cast polyurethane elastomers based on p-tetramethylxylene diisocyanate (p-TMXDI) having good compression set properties.

BACKGROUND

It is well known in the art to prepare polyurethane elastomers by reacting excess polyisocyanate with a polyol to form a liquid or low melting polyurethane prepolymer having terminally reactive isocyanate groups, which can then be reacted with a diamine curing agent to form a polyurethane elastomer. Unfortunately, some of these elastomers exhibit poor "compression set", which makes them undesirable for use in molded articles which are to be used under load as in machine rolls and wheels.

For such load-bearing uses it is essential that the elastomer exhibit high dimensional stability so as to retain its resilience and not form flat spots under extended use. This property is known in the art as "good compression set". Compression set is commonly determined by ASTM Method D395 and represents the amount of residual deformation that occurs when an elastomer sample is placed under load sufficient to reduce its height to a specified value, held under that load for a certain period of time at a constant temperature, and then released from the load. Thus, if the height before sample loading is 100 units and it is compressed under load to a height of 90 units, but recovers to a height of 95 units when the load is removed, its compression set is 50%, i.e., 50% of the deformation was permanent. Obviously, the lower the compression set value for a given elastomer, the better it is for load bearing uses.

U.S. Pat. No. 3,997,514 discloses a process for preparing polyurethane elastomers having a compression set of 50% or less. In the process an isocyanate terminated prepolymer is prepared and vulcanized by the steps of:

1. Encapping an aromatic diisocyanate, such as 2,4-tolylene diisocyanate, with a glycol, such as poly(tetramethylene ether)glycol (M.W. about 1,000)
2. reacting the resulting intermediate with an aliphatic diisocyanate to form a prepolymer, and
3. curing the prepolymer with a suitable diamine to form a vulcanizate having improved compression set, specifically 50% or less.

Examples of aromatic diisocyanates are given in the penultimate paragraph of column 1, and examples of aromatic polyamines useful as cross-linking agents are given in the penultimate paragraph of column 2. Tolylene diamines are among the examples of polyamines enumerated in this paragraph, as well as 4,4'-methylenedianiline.

U.S. Pat. No. 3,428,610 relates to cross-linked polyurethane plastics and to a method of preparing the same. The cross-linked polyurethanes are prepared by reacting (1) one equivalent of an intermediate containing between 0.5% and 15% free NCO groups with (2) between 0.8 to 1.2 equivalents of a liquid aromatic diamine. The liquid aromatic diamine has (i) one linear alkyl substituent of 1 to 3 carbon atoms in an ortho position to one amino group and two linear alkyl substituents of one to three carbon atoms in both ortho positions to the other amino groups, or (ii) two linear alkyl substituents of one to three carbon atoms in both ortho positions of both amino groups. The patent discloses that any suitable organic polyisocyanate may be used, such as an aliphatic polyisocyanate having the formula

$$OCN-(CH_2)_n-NCO$$

in which n=2 to 8 and aromatic diisocyanates. Examples of the polyisocyanates are given in the paragraph bridging columns 3 and 4. Among the examples of the suitable aromatic diamines that are set forth in the first full paragraph in column 4, are 1-methyl-3,5-diethyl-2,4-diaminobenzene and 1-methyl-3,5-diethyl-2,6-diaminobenzene. (Both of these isomers are also known as diethyltoluene-diamine or DETDA.) This reference, however, does not relate to the effect of the use of a particular aromatic diamine and its effect on the compression set properties of the resulting polyurethane elastomer.

U.S. Pat. No. 4,218,543 relates to a one-step process for the production of elastomeric moldings which have a compact surface by the technique of reaction injection molding, using highly reactive systems of specific polyisocyanates, polyhydroxyl compounds and specific active aromatic polyamines. This patent also relates to active hydrogen-containing blends useful in preparing elastomeric moldings, in which the blends comprise polyhydroxyl compounds, and specific active aromatic diamines. The elastomeric moldings are based on:

(a) 4,4'-diisocyanatodiphenylmethane and polyisocyanates based on 4,4'-diisocyanatodiphenylmethane;

(b) hydroxyl group containing compounds having a molecular weight of from 1,800 to 12,000 and preferably containing at least two primary hydroxyl groups;

(c) active aromatic amines as chain-lengthening agents;

(d) catalysts for the reaction between hydroxyl groups and isocyanate groups; and (e) optionally, blowing agents, auxiliary agents and/or additives known in polyurethane chemistry. Among the examples of the aromatic amines are 1-methyl-3,5-diethyl-2,4-diaminobenzene and 1-methyl-3,5-diethyl-2,6-diaminobenzene.

This patent (U.S. Pat. No. 4,218,543) is directed towards reaction injection molding of polyurethanes where the gelation times are extremely fast (approximately 1 second or less). Based on the teachings of this patent, it would not be expected that diethyltoluenediamines (DETDA) could be utilized in polyurethane cast elastomers which require gel times of the order of several minutes. In particular, it would not be expected that good compression set properties could be obtainable with a particular polyurethane prepolymer when DETDA is used as the curing agent to produce the polyurethane elastomer.

Good compression set is achievable in the known cast elastomer art, wherein, for example, toluene diisocyanate is the diisocyanate used to prepare the prepolymer, and curing is effected with methylenbis(o-chloroaniline)[MBCA, also known as MOCA ® brand of methylenebis(o-chloroaniline)]. The principal drawback of this system is the requirement for use of MBCA, which has been reported to be a cancer suspect agent based on tests with laboratory animals.

A welcome contribution to the art would be a polyurethane castable elastomer which has good compression set properties--i.e., a compression set value of less than or equal to 40%--and does not require the use of MBCA. Such a contribution is provided by this invention.

SUMMARY OF THE INVENTION

This invention provides a polyurethane elastomer composition, having a compression set less than or equal to about 40%, comprising the reaction product of p-TMXDI based prepolymer and an aromatic diamine selected from DETDA, 2,4-bis(p-aminobenzyl)aniline (BABA) and mixtures thereof.

DETAILED DESCRIPTION OF THE INVENTION

This invention provides a polyurethane elastomer composition, having a compression set of less than or equal to 40%, comprising the reaction product of:

(a) a polyurethane prepolymer having terminally reactive isocyanate groups and formed as a reaction product of polymeric diol with a stoichiometric excess of p-TMXDI; with (b) a curatively effective amount of a curative selected from the group consisting of DETDA, BABA and the mixtures thereof; and (c) optionally, from about 0.01% to about 2% by weight of catalyst, based on the weight of curative.

Another embodiment of this invention provides a method of making a polyurethane elastomer having a compression set of less than or equal to about 40% comprising the steps of reacting the polyurethane prepolymer of (a) with a curative of (b) and optionally the catalyst of (c).

In yet another embodiment of this invention, there are provided articles of manufacture made from the compositions of this invention.

The chemical formula of p-TMXDI is:

The p-TXMDI may also be made by methods known in the art, see for example, U. S. Pat. No. 4,361,518, U.S. Pat. No. 4,379,767, and U.S. Pat. No. 4,399,074, the disclosure of which are incorporated herein by reference.

The term "polymeric diol" as used herein includes mixtures of compatible diols, e.g., mixtures of polyether diols, mixtures of polyester diols, and compatible mixtures of polyether diols and polyester diols. Those skilled in the art will appreciate that the term "compatible" means the diols are mutually soluble in each other so as to form a single phase.

The polyether and polyester diols normally used in the preparation of polyurethane elastomers—e.g., hydroxyl-terminated—can be employed as the polymeric diols in preparing the compositions of this invention. Representative diols are polyalkylene ether glycols such as polyethylene ether glycol, polypropylene ether glycol and poly (tetramethylene ether) glycol and the polyethers prepared by the copolymerization of cyclic ethers such as ethylene oxide, propylene oxide, trimethylene oxide, and tetrahydrofuran with aliphatic diols such as ethylene glycol, 1,3-butanediol, 1,4-butanediol, diethylene glycol, dipropylene glycol, 1,2-propylene glycol, and 1,3-propylene glycol. Mixtures of polyethers, for example, a mixture of polytetramethylene ether glycol and polypropylene-polyethylene oxide ether glycol, may be used.

Suitable hydroxyl-terminated polyesters useful herein include, but are not limited to, polyethylene adipate, polypropylene adipate, poly(ethylene-propylene) adipate, polybutylene adipate, polyhexamethylene adipate, and the like, and the copolyesters prepared by copolymerizing ethylene glycol and propylene glycol with the foregoing polyesters during their preparation—such as, for example, poly(1,4-butylene-ethylene) adipate, poly(1,4-butylene-propylene) adipate, and poly(1,4-butylene-ethylene-propylene) adipate. Other hydroxyl-terminated polyesters are well recognized as useful in polyurethane technology and include those derived from the polymerization of caprolactones and from the condensation of dicarboxylic acids such as succinic, malonic, pimelic, sebacic and suberic acids among others with diols such as ethylene glycol, 1,2-propanediol, 1,3-propanediol, 2,2-dimethyl-1,3-propanediol, 1,4-butanediol, 1,5-pentanediol, 1,6-hexanediol, and the like. Mixtures of polyesters may also be used.

Polymeric diols having a number average molecular weight of at least about 300 may be used. Generally, the molecular weights used range from about 300 to about 6000. A range of about 400 to about 3000 is preferred with about 1000 to about 3000 being most preferred.

Any polyether having a number average molecular weight within the range specified above may be used. However, in general, polyethers are used having a number average molecular weight within the range of from about 445 to about 2100. Products within this range are commercially available. Preferably, the number average molecular weight is within the range of from about 800 to about 2000.

Any polyester having a number average molecular weight within the range specified above for polymeric diols may be used. However, in general, polyesters are used having a number average molecular weight within the range of from about 300 to about 3500, with about 400-3000 being preferred and about 1000 to about 3000 being most preferred.

A stoichiometric excess, as stated above, of p-TMXDI is reacted with polymeric diol to form the prepolymer of (a). Generally, the ratio of equivalents of —NCO groups in the p-TMXDI to —OH groups in the polymeric diol is from about 2:1 to about 5:1 with about 2.5:1 to about 4.5:1 being preferred and about 3.0:1 to about 3.5:1 being most preferred.

The prepolymers from which the polyurethanes are prepared have an isocyanate content (% NCO) of at least about 2 wt %, based on the weight of the prepolymer. Usually the isocyanate content is within the range of from about 2.0 to about 9.0 wt %, with about 4.0 to about 7.5 wt % being preferred, and from about 4.5 to about 7.0 wt % being more preferred. The % NCO is related to the hardness of the final cured elastomer, and may vary depending on the hardness desired.

The curative that is reacted with the prepolymer of (a) is selected from the group consisting of DETDA, BABA and mixtures thereof.

DETDA usually refers to the two isomers 1-methyl-3,5-diethyl-2,4-diaminobenzene and 1-methyl-3,5-diethyl-2,6-diaminobenzene. A mixture reportedly containing 76% by weight of the 2,4-isomer and 21% by weight of the 2,6-isomer is available commercially from Ethyl Corp. (The balance of the product reportedly comprises other alkylated m-phenylenediamines.) Any combination of the 2,4- and 2,6-isomers in admixture or the individual isomers themselves may prove useful. However, since separation of the isomers is difficult, due to their very similar physical properties, it is economically advantageous to use DETDA which is commercially available.

A mixture of DETDA and BABA may be used with the amount of each in the mixture varying according to the properties of the elastomer desired. However, there is no added advantage in combining the two. Both DETDA and BABA result in elastomers having good compression set properties, however, DETDA is preferred. This is because, for polymers having the same isocyanate content, using DETDA appears to result in elastomers having higher values for properties such as tensile strength, elongation, and tear strength.

Preferably, about 75% to about 110% of the stoichiometric amount of the curative is used. Unlike known analogous toluene diisocyanate based prepolymers cured with known curatives such as MBCA, the stoichiometric ratio (equivalents of amine in the curative/equivalents of isocyanate in the prepolymer) is not highly critical. However, for convenience, about 85% to about 95% is a preferred stoichiometric ratio.

Polyurethanes are prepared by well-known methods whereby one or more of the aforementioned polymeric diols is reacted with a stoichiometric excess of the aforementioned p-TMXDI. The resulting reaction product (prepolymer) is then further reacted with the above described curative. During prepolymer preparations, benzoyl chloride may optionally be added in amounts from about 0.005 to about 0.1 percent by weight based on the weight of the prepolymer. Those skilled in the art will appreciate that the benzoyl chloride may be employed to keep the prepolymer slightly acidic as may be necessary or desirable in a given application for reasons of processing or obtaining specific prepolymer characteristics.

Optionally a conventional polyurethane catalyst may be used in the curing operation. Catalysts which may be used include but are not limited to mono- and dicarboxylic acids and their metal salts, such as glutaric acid, pimelic acid, azelaic acid, propionic acid, valeric acid, caproic acid, caprylic acid, myristic acid, palmitic acid, stearic acid, stannous stearate, chromium naphthenate, molybdenum naphthenate, lead naphthenate, dibutyltin dilaurate, dibutyltin diacetate, dimethyltin dilaurate and the like. Also useful are tertiary amines, such as triethylene diamine, dimethyl oleylamine, triethylene diamine, N-ethylmorpholine, and the like; and anhydrides of carboxylic acids, such as stearic anhydride, phthalic anhydride, and the like. The catalyst preferably should either be soluble in the polymer composition or compatible therewith at curing temperatures. The preferred catalysts for the reaction because of ready availability and low cost, are the mono- and dicarboxylic acids. They are normally used in an amount of from about 0.01% to about 2% by weight, based on the weight of curatives, with about 0.1% to about 1% by weight being preferred.

The following examples are provided for the purposes of illustration only. The examples should not be construed as limiting the invention in any way as variations of the invention are possible which do not depart from the spirit and scope of the appended claims.

Prepolymer Preparation

In Example 1 a polyether prepolymer is made by mixing:

(a) 1000 g (1 equivalent) of TERACOL® 2000 brand of a 2000 number average molecular weight poly(tetramethylene ether)glycol from E. I. du Pont de Nemours & Co., Inc.; with (b) 390 g (3.2 equivalents) of p-TMXDI; in the presence of (c) 0.01% by weight, based on the weight of (a+b), of dibutlytin dilaurate (M & T catalyst T-12, a trademark of M & T Chemicals, Inc.)

at 85° C. for 4 hours The isocyanate capped prepolymer had a NCO content of 6.2%.

The polyether prepolymers of Examples 2–15 were prepared following the procedure of Example 1. Table I gives the amount of TERACOL® 2000 brand of poly(tetramethylene ether)glycol and p-TMXDI used to prepare the prepolymers. The catalyst used was the same as that used for Example 1. The Table I, "eq" is the abbreviation for "equivalent."

TABLE I

| | Prepolymer Preparation | |
|---|---|---|
| NCO CONTENT, % | TERACOL® 2000 | p-TMXDI |
| 6.6 | 1000 g (1 eq) | 422 g (3.46 eq) |
| 5.9 | 1500 g (1.5 eq) | 578 g (4.74 eq) |
| 5.5 | 1500 g (1.5 eq) | 549 g (4.5 eq) |
| 5.1 | 1500 g (1.5 eq) | 520 g (4.26 eq) |
| 5.2 | 2000 g (2 eq) | 693 g (5.68 eq) |

Curing

For examples 1–16, curing of the prepolymer was done by mixing a stoichiometric amount of the curative, usually at 90%, unless indicated otherwise, with the prepolymer at 100° C. and then pouring into a mold at 100° C. and pressing to form a 0.08" thick sheet or 0.5" thick buttons. After demolding, usually after 30–60 minutes, the sheets and buttons were post-cured in an oven for another 16 hours at 100° C.

The pot life (at 100° C.) for the compositions of this invention generally falls within about 2 to about 10 minutes, depending on how much, if any, catalyst is used. This range is within the acceptable limits for commercial applications.

In Tables II-V, the physical properties listed were determined by the following test procedures:

| | |
|---|---|
| Hardness, Shore A | ASTM 2240 |
| Hardness, Shore D | ASTM 2240 |
| 100% Modulus | ASTM D-412 |
| 200% Modulus | ASTM D-412 |
| 300% Modulus | ASTM D-412 |
| Tensile Strength, psi | ASTM D-412 |
| Elongation, %, | ASTM D-412 |
| Tear Strength Die "C", pli | ASTM D-624 |
| Compression Set | ASTM D-395B, 22 hours at 70° C. |

EXAMPLES 1–6

Table II, Examples 1–6, reports the results of physical tests performed on the compositions of this invention. The DETDA used in Examples 1–5 was obtained from Ethyl Corp. The compression set values of DETDA-cured and BABA-cured polymers were all below 40%.

In Table II, the following abbreviations are used:
MDA=4,4'-methylenedianiline
MDPA=methylenebis(dipropylaniline) (available from Ethyl Corp.)
BDO=1,4-butanediol

TABLE II

Physical Properties of Polyurethane Polymers Based on p-TMXDI and Cured with DETDA and BABA

| | EXAMPLES | | | | | |
|---|---|---|---|---|---|---|
| | 1 | 2 | 3 | 4 | 5 | 6 |
| Prepolymer | | | | | | |
| NCO % | 6.2 | 6.6 | 5.9 | 5.5 | 5.1 | 5.1 |
| Curative | DETDA | DETDA | DETDA | DETDA | DETDA | BABA |
| Physical Properties | | | | | | |
| Hardness A | 94 | 94 | 94 | 89 | 90 | 86 |
| D | 46 | 41 | 38 | 36 | 34 | 31 |
| Modulus 100%, psi | 1260 | 1230 | 1100 | 1050 | 1100 | 1100 |
| 200%, psi | 1550 | 1510 | 1330 | 1300 | 1400 | — |
| Tensile Strength, psi | 5740 | 4480 | 4430 | 5960 | 6140 | 1640 |
| Elongation, % | 520 | 490 | 540 | 600 | 520 | 185 |
| Tear Strength, Die "C", pli | 630 | 610 | 590 | 585 | 575 | 260 |
| Compression Set | 34 | 36 | 29 | 32 | 26 | 26 |
| Compression Set* | 31 | 31 | 26 | 23 | 22 | 22 |

*After 4 days post cure at 100° C.

COMPARATIVE EXAMPLES 7–10

Table III, Comparatives Examples 7–10, reports the results of physical tests performed on compositions not of this invention—i.e., compositions that were cured with a curative other than DETDA or BABA. The compression set values of these compositions were all above 40%.

TABLE III

Physical Properties of Polyurethane Polymers Based on p-TMXDI and Cured With Curatives Not of This Invention

| | EXAMPLES | | | |
|---|---|---|---|---|
| | 7 | 8 | 9 | 10 |
| Prepolymer | | | | |
| NCO % | 6.2 | 6.6 | 6.6 | 5.9 |
| Curative | MDA | MDPA | MDA | BDO |
| Physical Properties | | | | |
| Hardness A | 85 | 92 | 84 | 93 |
| D | — | 42 | — | 36 |
| Modulus 100% | 900 | 1150 | 1020 | 1000 |
| 200% | 1350 | 1680 | 1580 | — |
| Tensile Strength, psi | 4730 | 4165 | 4400 | 4700 |
| Elongation, % | 550 | 350 | 510 | 615 |
| Tear Strength, Die "C", pli | 530 | 435 | 515 | — |
| Compression Set | 43 | 82 | 45 | 80 |
| Compression Set* | 68 | 75 | 61 | — |

*After 4 days post cure at 100° C.

EXAMPLES 11–15

Examples 11–15 (Table IV) show the surprising insensitivity of the favorable results for the compositions of this invention, in particular the compression set, to stoichiometry. The procedures of Example 1 was follwed using a prepolymer from p-TMXDI and polytetramethylene ether glycol having 5.2% NCO, with DETDA as the curative, and the stoichiometric ratio was varied between 75% and 110%. In all cases, attractive physical properties were found for the cured elastomer. The compression set was always well below 40%.

TABLE IV

Physical Properties of Polyurethane Polymers Based on p-TMXDI and Cured With Varying Stoichiometric Amounts of DETDA*

| | EXAMPLES | | | | |
|---|---|---|---|---|---|
| | 11 | 12 | 13 | 14 | 15 |
| Elastomer, Preparation | | | | | |
| Stoichiometry, NH$_2$/NCO, % | 75 | 85 | 90 | 100 | 110 |
| % NCO of prepolymer | 5.2 | 5.2 | 5.2 | 5.2 | 5.2 |
| Physical Properties | | | | | |
| Hardness, Shore A | 88 | 91 | 91 | 91 | 91 |
| 100% Modulus, psi | 950 | 1030 | 1100 | 1100 | 1180 |
| 300% Modulus, psi | 1420 | 1600 | 1780 | 1850 | 1770 |
| Tensile Strength, psi | 4760 | 5800 | 6640 | 6050 | 4910 |
| Elongation, % | 610 | 560 | 550 | 530 | 580 |
| Tear Strength, Die "C", pli | 490 | 550 | 560 | 600 | 620 |
| Compression Set | 32 | 28 | 33 | 26 | 31 |

*With 0.5 wt % azelaic acid, based on the wt of DETDA

EXAMPLE 16

In Example 16, the same procedure used for Example 1 was used. However, in this example a polyester diol was used to make the prepolymer instead of a polyether diol.

The polyester prepolymer was made by mixing:
(a) 1801.4 g (1.72 equivalents) of poly (ethylene adipate), having a number average molecular weight of 2100; with
(b) 582 g (4.77 equivalents) of p-TMXDI; in the presence of
(c) 0.01% by weight, based on the weight of (a+b), of dibutyltin dilaurate (M&T catalyst T-12, a trademark of M&T Chemicals, Inc.)

The isocyanate capped prepolymer had a NCO content of 5.26%.

The prepolymer was cured with DETDA (available from Ethyl Corp.) at a stoichiometric amount of 90%. The physical properties of the elastomer are given in Table V.

TABLE V

Physical Properties of a Polyurethane Polymer From a Prepolymer Based on a Polyester and p-TMXDI

| Property | Result | Result* |
|---|---|---|
| Hardness A | 90 | 93 |
| Modulus 100% | 910 | 1110 |
| Modulus 300% | 1560 | 1910 |

TABLE V-continued

Physical Properties of a Polyurethane Polymer From a Prepolymer Based on a Polyester and p-TMXDI

| Property | Result | Result* |
|---|---|---|
| Tensile Strength, psi | 4525 | 5480 |
| Elongation, % | 610 | 610 |
| Tear Strength, Die "C", pli | 500 | — |
| Compression Set | 39.1 | 28.4 |

*After 4 days Post Cure

What is claimed is:

1. A polyurethane elastomer composition, having a compression set less than or equal to about 40%, comprising the reaction product of:
   (a) a polyurethane prepolymer having terminally reactive isocyanate groups and formed as a reaction product of polymeric diol with a stoichiometric excess of p-tetramethylxylene diisocyanate with
   (b) a curatively effective amount of a curative selected from the group consisting of: diethyltoluenediamine, 2,4-bis(p-aminobenzyl)aniline, and mixtures thereof; and
   (c) optionally, from about 0.01% to about 2% by weight of catalyst, based on the weight of curative.

2. An elastomer of claim 1 wherein the ratio of equivalents of p-tetramethylxylene diisocyanate to polymeric diol is about 2:1 to about 5:1.

3. An elastomer of claim 1 wherein the ratio of equivalents of p-tetramethylxylene diisocyanate to polymeric diol is about 2.5:1 to about 4.5:1.

4. An elastomer of claim 1 wherein the ratio of equivalents of p-tetramethylxylene diisocyanate to polymeric diol is about 3.0:1 to about 3.5:1.

5. An elastomer of claim 1 wherein said diol is selected from the group consisting of:
   (i) a polyether selected from the group consisting of polytetramethylene ether glycol; polypropylene ether glycol; polypropylene-polyethylene oxide ether glycol; and mixtures thereof;
   (ii) a polyester selected from the group consisting of polyethylene adipate; polypropylene adipate; poly(ethylene-propylene) adipate; polybutylene adipate; polyhexamethylene adipate; polycaprolactone; and mixtures thereof; and
   (iii) a compatible mixture of polyether diols and polyester diols.

6. An elastomer of claim 5 wherein said diol is polytetramethylene ether glycol.

7. An elastomer of claim 5 wherein said diol is polyethylene adipate.

8. An elastomer of claim 1 wherein said prepolymer has an isocyanate content of about 2.0 to about 9.0 wt %, based on the weight of prepolymer.

9. An elastomer of claim 1 wherein said curative is present in amount of from about 75% to about 110% of the stoichiometric amount.

10. An elastomer of claim 1 wherein said curative is diethyltoluenediamine.

11. An elastomer of claim 1 wherein said curative is 2,4-bis(p-aminobenzyl)aniline.

12. An elastomer of claim 1 wherein said prepolymer has an isocyanate content of about 4.5 to about 7.0 wt %, based on the weight of prepolymer.

13. A polyurethane elastomer composition, having a compression set less than or equal to about 40%, comprising the reaction product of:
   (a) A polyurethane prepolymer having terminally reactive isocyanate groups and formed as a reaction product of polymeric diol selected from the group consisting of:
   (i) a polyether selected from the group consisting of polytetramethylene ether glycol; polypropylene ether glycol; polypropylene-polyethylene oxide ether glycol; and mixtures thereof;
   (ii) a polyester selected from the group consisting of polyethylene adipate; polypropylene adipate; poly(ethylenepropylene) adipate; polybutylene adipate; polyhexamethylene adipate; polycaprolactone; and mixtures thereof; and
   (iii) a compatible mixture of polyether diols and polyester diols;
   with a stoichiometric excess of p-tetramethylxylene diisocyanate, said prepolymer having an isocyanate content of about 2.0 to about 9.0 wt %, based on the weight of prepolymer; with
   (b) Between about 75% and about 110% of the stoichiometric amount of a curative selected from the group consisting of: -diethyltoluenediamine, 2,4-bis-(p-aminobenzyl)aniline and mixtures thereof; and
   (c) Optionally, from about, 0.01% to about 2% by weight of catalyst, based on the weight of curative, said catalyst being selected from the group consisting of mono and dicarboxylic acids, metal salts of mono and dicarboxylic acids, carboxylic acid anhydrides and tertiary amines.

14. An elastomer of claim 13 wherein the ratio of equivalents of p-tetramethylxylene diisocyanate to polymeric diol is about 2:1 to about 5:1.

15. An elastomer of claim 13 wherein the ratio of equivalents of p-tetramethylxylene diisocyanate to polymeric diol is about 2.5:1 to about 4.5:1.

16. An elastomer of claim 13 wherein the ratio of equivalents of p-tetramethylxylene diisocyanate to polymeric diol is about 3.0:1 to about 3.5:1.

17. An elastomer of claim 13 wherein said diol is polytetramethylene ether glycol.

18. An elastomer of claim 13 wherein said diol is polyethylene adipate.

19. An elastomer of claim 13 wherein said curative is diethyltoluenediamine.

20. An elastomer of claim 13 wherein said curative is 2,4-bis(p-aminobenzyl)aniline.

21. An elastomer of claim 13 wherein said prepolymer has an isocyanate content of about 4.5 to about 7.0 wt %, based on the weight of prepolymer.

22. An elastomer of claim 13 wherein the ratio of equivalents of p-tetramethylxylene diisocyanate to polymeric diol is about 2:1 to about 5:1 and wherein said isocyanate content is about 4.5 to about 7.0 wt %.

23. An elastomer of claim 13 wherein said diol is polytetramethylene ether glycol and said curative is diethyltoluenediamine or 2,4-bis(p-aminobenzyl)aniline, or wherein said diol is polyethylene adipate and said curative is diethyltoluene diamine.

24. An article of manufacture made from the composition of claim 1.

25. An article of manufacture made from the composition of claim 13.

26. A method of making a polyurethane elastomer having a compression set of less than or equal to about 40% comprising the steps of reacting:
   (a) A polyurethane prepolymer having terminally reactive isocyanate groups and formed as a reaction product of polymeric diol with a stoichiometric excess of p-tetramethylxylene diisocyanate; with (b) A curatively effective amount of a curative selected from the group consisting of: diethyltoluenediamine, 2,4-bis(p-aminobenzyl)aniline, and mixtures thereof; and (c) optionally, from about 0.01% to about 2% by weight of catalyst based on the weight of curative.

* * * * *